United States Patent [19]
Libert et al.

[11] Patent Number: 5,948,846
[45] Date of Patent: Sep. 7, 1999

[54] POLYOLEFIN-BASED COMPOSITION AND PROCESS FOR THE MANUFACTURE OF SHAPED OBJECTS FROM THIS COMPOSITION

[75] Inventors: Daniel Libert, Ottignies; Alain Wyart, Brussels, both of Belgium

[73] Assignee: Solvay (Société Anonyme), Brussels, Belgium

[21] Appl. No.: 08/770,891

[22] Filed: Dec. 20, 1996

Related U.S. Application Data

[63] Continuation of application No. 08/454,709, May 31, 1995, abandoned.

[30] Foreign Application Priority Data

Jun. 15, 1994 [BE] Belgium ................. 09400578

[51] Int. Cl.⁶ ................. C08J 5/16; C08J 3/34
[52] U.S. Cl. ................. 524/451; 524/261; 524/269; 524/318; 524/312; 524/313; 524/366; 524/388; 524/520; 524/394; 524/232
[58] Field of Search ................. 524/232, 451, 524/261, 269, 318, 312, 313, 366, 388, 520, 394

[56] References Cited

U.S. PATENT DOCUMENTS

| | | | |
|---|---|---|---|
| 3,330,796 | 7/1967 | Mock et al. | 260/32.6 |
| 4,785,042 | 11/1988 | Azuma et al. | 524/232 |
| 4,795,482 | 1/1989 | Gioffre et al. | 55/75 |

FOREIGN PATENT DOCUMENTS

| | | |
|---|---|---|
| 0215444 | 3/1987 | European Pat. Off. . |
| 0464782 | 1/1992 | European Pat. Off. . |
| 62-062842 | 3/1987 | Japan . |

*Primary Examiner*—Peter D. Mulcahy
*Attorney, Agent, or Firm*—Venable; George H. Spencer; Ashley J. Wells

[57] ABSTRACT

A composition which is polyolefin-based includes polyolefin; from 0.1 to 5 parts by weight of lubricating agent per 100 parts by weight of the polyolefin; and from 0.05 to 2 parts by weight of zeolite per 100 parts by weight of the polyolefin, which zeolite is a crystalline aluminosilicate having a water adsorptivity not exceeding 10% of its weight, at 25° C. and at a water vapor partial pressure of 4.6 torr, and having an Si/Al molar ratio in the crystal lattice of at least 35.

10 Claims, No Drawings

POLYOLEFIN-BASED COMPOSITION AND PROCESS FOR THE MANUFACTURE OF SHAPED OBJECTS FROM THIS COMPOSITION

This Application is a Continuation of application Ser. No. 08/454,709 filed May 31, 1995.

BACKGROUND OF THE INVENTION

1. Field of the Invention

The invention relates to a polyolefin-based composition including a lubricating agent, in particular such a composition intended for the manufacture of bottle caps. It also relates to a process for the manufacture of shaped objects, in particular a process for the manufacture of bottle caps from this composition.

2. Description of the Related Art

It is generally known to manufacture bottle caps from polyolefins and in particular from polyethylene. It is also known to incorporate a lubricating agent in the polyolefin in order to optimize the slip properties and thus to facilitate the unscrewing of the cap. In patent U.S. Pat. No. 3,330,796 it has already been proposed to improve the friction properties of polyolefin-based, in particular polyethylene, films by incorporating docosenoamide therein.

When it is employed as raw material in the manufacture of caps for bottles for food products, this known composition exhibits the disadvantage of imparting to the packaged products organoleptic properties (odor and taste) which are unsuitable for consumption.

SUMMARY OF THE INVENTION

The invention overcomes this disadvantage by providing a new polyolefin-based composition including a lubricating agent which does not impart any bad taste or bad odor to the packaged food product when the composition is employed in the manufacture of caps for bottles for food products.

To this end the invention relates to a polyolefin-based composition including, per 100 parts by weight of polyolefin, from 0.1 to 5 parts by weight of lubricating agent and from 0.05 to 2 parts by weight of zeolite, this zeolite being a crystalline aluminosilicate exhibiting a water adsorptivity not exceeding 10% of its weight, at 25° C. and at a water vapor partial pressure of 4.6 torr.

For the purposes of the present invention, zeolite is intended to denote one or more zeolites corresponding to the specifications given above. Similarly, polyolefin and lubricating agent are intended to denote one or more polyolefins and one or more lubricating agents respectively.

One of the essential properties of the zeolite of the composition according to the invention is its hydrophobic character, measured by its water adsorptivity at 25° C. at a water vapor partial pressure of 4.6 torr. This adsorptivity is preferably lower than 6% by weight. Such a low water content can be obtained by removing the water of hydration by any suitable known means making it possible to remove any substance plugging the pores of the zeolite, such as, for example, a calcination or washings.

The zeolite of the composition according to the invention preferably exhibits an Si/Al molar ratio in the crystal lattice of at least 35. In general the ratio does not exceed 5000. It is preferably from 200 to 500.

The zeolite of the composition according to the invention advantageously exhibits a mean pore diameter of at least 5.5 Å, in particular of at least 6.2 Å. In general the mean diameter does not exceed 20 Å; preferably 15 Å.

In most cases the zeolite of the composition according to the invention corresponds to the general formula $$xM_{2/n}O \cdot Al_2O_3 \cdot ySiO_2 \cdot zH_2O$$

in which M denotes an element of groups IA and IIA of the Periodic Table, n denotes the valency of M, x, y and z denote numbers greater than 0, y being at least 70 and z being such that the water content of the zeolite does not exceed 10% of its weight.

Sodium, potassium, magnesium and calcium may be mentioned as typical examples of the element M. In most cases M is sodium or calcium. Zeolites which are particularly preferred contain not more than 2.4% by weight of aluminium oxide and not more than 5% by weight of sodium oxide.

They may also be zeolites simultaneously containing a number of oxides $M_{2/n}O$ of different elements M.

The zeolite of the composition according to the invention is generally in the form of particles with a mean diameter not exceeding 10 μm, preferably not exceeding 8 μm. The mean diameter is usually at least 0.1 μm, in particular at least 1μm, values of 1 to 5 μm being the most recommended ones, for example approximately 3 μm. The zeolite particles advantageously have a specific surface, as measured by the volumetric method using nitrogen entry according to British Standard BS 4359/1 (1984), of at least 200 m²/g, preferably of at least 300 m²/g, more particularly of at least 400 m²/g. The specific surface generally does not exceed 1000 m²/g and is preferably more than 800 m²/g.

Zeolites which are very particularly advantageous in the composition according to the invention are those described in U.S. Pat. No. 4,795,482.

According to the invention the composition includes one or more zeolites in a total quantity of 0.05 to 2 parts by weight per 100 parts by weight of polyolefin. Particularly satisfactory results are obtained with total zeolite contents of at least 0.08 parts by weight, values of at least 0.1 part by weight being the most recommended ones; the total zeolite content is advantageously at most 1 part by weight, total maximum contents of 0.5% being very particularly preferred.

The composition according to the invention also includes a lubricating agent. "Lubricating agent" is intended to denote any additive for polyolefins which is used to reduce the friction between a first article manufactured from the polyolefin and another article which is in contact with the first, in particular to avoid friction between a polyolefin cap and a bottle, in order to facilitate the unscrewing of the cap.

The lubricating agent of the composition according to the invention may be chosen from fatty acids (such as lauric, oleic or stearic acid), fatty acid esters, fatty acid salts (such as calcium or zinc stearate), fatty acid amides (such as oleamide, stearamide and docosenoamide) polyols (such as trimethylolpropane or pentaerythritol), mono- or polyalcohol monoethers (such as polyethylene glycol monoether), glycerol esters (such as glycerol monostearate), waxes (such as polyolefins of low molecular mass), polysiloxanes (such as dimethylpolysiloxane) and fluoropolymers (such as polyvinylidene fluoride or polytetrafluoroethylene). Lubricating agents which give good results are glycerol esters, polysiloxanes and amides of saturated or unsaturated fatty acids containing from 12 to 35 carbon atoms, and mixtures thereof. Preference is given to glycerol esters and amides of unsaturated fatty acids containing from 15 to 30 carbon atoms, and in particular glycerol monostearate, 13-docosenoamide and mixtures thereof.

The composition according to the invention includes the lubricating agent in a total quantity of at least 0.1 part by weight per 100 parts by weight of polyolefin, in particular of at least 0.2 parts by weight, quantities of at least 0.4 parts by weight being the most common ones; the total quantity of lubricating agents does not exceed 5 parts by weight, more especially 2 parts by weight, maximum values of 1 part by weight per 100 parts by weight of polyolefin being recommended.

Polyolefin is intended to denote olefin homopolymers and olefin copolymers with one or more comonomers, which are well known to a person skilled in the art, and mixtures thereof. The preferred olefins are ethylene and propylene. The preferred comonomers of ethylene are butene and hexene; the preferred comonomers of propylene are ethylene and butene.

The polyolefin is preferably a polyethylene chosen from ethylene homopolymers and copolymers containing one or more comonomers. In general, the quantity of comonomer in the copolymer is at least 0.01 mol %, in particular at least 0.1 mol %, quantities of at least 0.5 mol % being the most advantageous ones. The quantity of comonomer is usually at most 10 mol %, more precisely at most 5 mol %, quantities not exceeding 3 mol % being recommended. Particularly effective results are obtained with quantities of comonomer of 0.4 to 1 mol %.

The preferred polyolefin is chosen from ethylene homopolymers and copolymers, called "polyethylenes" hereinafter. These generally exhibit a standard density, measured according to ISO standard 1183 (1987), of at least 930 kg/m$^3$, in most cases of at least 935 kg/m$^3$, values of at least 940 kg/m$^3$ being the most advantageous ones. The standard density is commonly at most equal to 965 kg/m$^3$, more especially at most equal to 960 kg/m$^3$, values of not more than 955 kg/m$^3$ being recommended. The standard densities from 950 to 955 kg/m$^3$ are preferred.

In most cases the polyethylene is additionally characterized by a melt index, measured at 190° C. under a 5 kg load according to ISO standard 1133 (1991) of at least 0.05 g/10 min, in particular of at least 0.1 g/10 min, values of at least 0.2 being the most common ones. The melt index generally does not exceed 10 g/10 min, preferably 8 g/10 min, values of not more than 5 g/10 min being recommended. Melt indices of 1 to 3 g/10 min, for example approximately 2 g/10 min, are preferred.

Besides the polyolefin, the lubricating agent and the zeolite, the composition according to the invention may also contain usual additives such as stabilizers (for example antiacids, antioxidants and/or UV stabilizers), organic or inorganic colorants (such as, for example, iron oxide) or antistatic agents. The content of each of the additives is generally lower than 10 parts by weight per 100 parts by weight of polyolefin.

The composition according to the invention may be obtained by any suitable known means, for example by mixing the polyolefin with the lubricating agent and the zeolite at ambient temperature, followed by blending at a temperature above the melting temperature of the polyolefin, for example in a mechanical mixer or in an extruder. An alternative method consists in introducing the lubricating agent and/or the zeolite into the polyolefin which is already molten.

It is optionally possible to proceed in two successive stages, the first consisting in mixing the polyolefin, the lubricating agent and the zeolite and optionally one or more additives at ambient temperature, the second stage consisting in continuing the mixing in the melt in an extruder. The temperature of the second stage is generally from 100 to 300° C., in particular from 120 to 250° C., in particular from approximately 130 to 210° C.

It is also possible to prepare, in a first step, a masterbatch including a first fraction of the polyolefin, the lubricating agent, the zeolite and optionally other usual additives, this masterbatch being rich in lubricating agent and zeolite. This masterbatch is subsequently mixed with the remaining fraction of the polyolefin, for example during the manufacture of granules of the composition.

The composition according to the invention exhibits simultaneously good slip properties, which make it suitable for being employed for the manufacture of bottle caps, and good organoleptic properties, which make it usable in food-contact applications.

The composition according to the invention is suitable for being used in all the conventional processes for the manufacture of shaped objects made of polyolefins, and more particularly in the extrusion, blow-extrusion, extrusion-thermoforming and injection molding processes. It is well suited for the manufacture of shaped objects by injection molding, in particular of bottle caps.

Consequently, the present invention also relates to a process for the manufacture of shaped objects from the composition according to the invention, in particular a process for the manufacture of bottle caps by injection molding of this composition.

DESCRIPTION OF THE PREFERRED EMBODIMENTS

The examples whose description follows are used to illustrate the invention. Example 3 is given by way of comparison. The meaning of the symbols employed in these examples, the units expressing, the quantities mentioned and the methods, of measuring these quantities are detailed below.

MI=melt index of the polyolefin, expressed in g/10 min, measured at 190° C. under a 2.16 kg load according to ASTM standard D 1238 (1986).

SD=standard density of the polyolefin, expressed in kg/m$^3$, measured according to ISO standard 1183 (1987).

OI=organolepticity index, measured according to the following method:

8 g of small plaques or caps injection-molded from granules of the polyolefin-based composition (approximately 1 cm$^3$ in size) are stored for 15 days at 23° C. and then suspended in 250 cm$^3$ of water. The suspension thus obtained is heated to 60° C. for 24 h. Next, 3 different operators taste the water of the suspension which is cooled to ambient temperature and assess its taste. Each of them gives a mark from 1 to 4, comparing it to a sample water which has undergone the same treatment in the absence of small plaques, the mark of 1 corresponding to the taste of this water sample. A high mark corresponds to a bad taste. The organolepticity index (OI) is the average of the 3 operators' marks.

EXAMPLE 1 (in accordance with the invention)

In this example granules of the composition in accordance with the invention were manufactured and their organoleptic properties were subsequently tested. A composition including the following was mixed (at 190° C.) in an extruder and granulated:

100 parts by weight of polyethylene (containing approximately 3 mol % of butene) exhibiting an MI of 1.8 g/10 min and an SD of 952 kg/m$^3$;

0.05 parts by weight of antiacid agent (calcium stearate);

0.025 parts by weight of antioxidant [stearyl beta-(3,5-di-t-butyl-4-hydroxyphenyl)propionate];

0.04 parts by weight of antioxidant [bis(2,4-di-t-butyl) pentaerythritol diphosphite];

0.25 parts by weight of lubricating agent (glycerol monostearate);

0.2 parts by weight of lubricating agent (docosenoamide);

0.2 party by weight of UV stabilizer (a polyester of succinic acid and of N-beta-hydroxyethyl-2,2,6,6-tetramethyl-4-hydroxypiperidine);

0.1 part by weight of Abscents® 3000 zeolite produced by the company UOP (exhibiting an Si/Al molar ratio higher than 35, a mean pore diameter greater than 5.5 Å and a water adsorptivity lower than 10% by weight).

No odor was given off from the extruder during the granulation.

The granules of the composition thus obtained had an OI of 2.5.

EXAMPLE 2 (in accordance with the invention)

The operations of Example 1 were repeated using a quantity of Abscents zeolite of 0.2 parts by weight instead of 0.1 part by weight. No odor was given off from the extruder during the granulation. The granules of the composition thus obtained had an OI of 1.3.

EXAMPLE 3 (by way of comparison)

In this example granules were manufactured from a composition including the same constituents as the composition of Examples 1 and 2 with the exception of the zeolite.

The operations of Example 1 were repeated, the introduction of the zeolite to the composition being omitted. An odor was given off from the extruder during the granulation. The (zeolite-free) composition thus obtained had an OI of 3.5.

A comparison of the result of Example 3 with that of Examples 1 and 2 reveals the progress contributed by the invention insofar as the organoleptic properties are concerned.

What is claimed is:

1. A composition which is polyolefin-based and which is for food-contact applications providing improved organoleptic properties to a shaped object manufactured therefrom, comprising:

polyolefin;

from 0.1 to 5 parts by weight of lubricating agent per 100 parts by weight of the polyolefin, the lubricating agent being selected from the group consisting of fatty acids, fatty acid esters, fatty acid salts, fatty acid amides, polyols, mono- or poly-alcohol monoethers, glycerol esters, waxes, polysiloxanes, fluoropolymers and mixtures thereof; and from 0.05 to 2 parts by weight of zeolite per 100 parts by weight of polyolefin, which zeolite is a crystalline aluminosilicate having a water adsorptivity not exceeding 10% of its weight, at 25° C. and at a water vapor partial pressure of 4.6 torr, having an Si/Al molar ratio in the crystal lattice of at least 35, and having a general formula

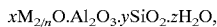

$xM_{2/n}O.Al_2O_3.ySiO_2.zH_2O$, where:

M denotes an element selected from the group consisting of group IA and group IIA of the Periodic Table, n denotes valency of M, and x, y and z denote numbers greater than 0, y being at least 70 and z being such that the zeolite has a water content that does not exceed 10% of its weight.

2. The composition according to claim 1, wherein the zeolite has a mean pore diameter ranging from 5.5 Å to 15 Å.

3. The composition according to claim 1, wherein the lubricating agent is selected from the group consisting of glycerol esters, polysiloxanes, amides of saturated or unsaturated fatty acids containing from 12 to 35 carbon atoms, and mixtures thereof.

4. The composition according to claim 3, wherein the lubricating agent is selected from the group consisting of glycerol monostearate, docosenoamide, and mixtures thereof.

5. The composition according to claim 1, wherein the polyolefin is a polyethylene selected from the group consisting of ethylene homopolymers, and ethylene copolymers containing ethylene and one or more comonomers.

6. The composition according to claim 5, wherein the polyethylene has a standard density ranging from 930 to 965 kg/m³ and a melt index ranging from 0.05 to 10 g/10 min.

7. A process for the manufacture of shaped objects from the polyolefin-based composition according to claim 1.

8. The process according to claim 7, applied to the manufacture of bottle caps by injection molding.

9. A process for improving organoleptic properties of a shaped object for food-contact applications, comprising:

a. providing a composition which is polyolefin-based and which is comprised of:

polyolefin;

from 0.1 to 5 parts by weight of lubricating agent per 100 parts by weight of the polyolefin, the lubricating agent being selected from the group consisting of fatty acids, fatty acid eaters, fatty acid salts, fatty acid amides, polvols, mono- or poly-alcohol monoethers, glycerol esters, waxes, polysiloxanes, fluoropolymers and mixtures thereof; and from,0.05 to 2 parts by weight of zeolite per 100 parts by weight of polyolefin, which zeolite is a crystalline aluminosilicate having a water adsorptivity not exceeding 10% of its weight, at 25° C. and at a water vapor partial pressure of 4.6 torr, having an Si/Al molar ratio in the crystal lattice of at least 35, and having a general formula

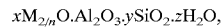

$xM_{2/n}O.Al_2O_3.ySiO_2.zH_2O$, where:

M denotes an element selected from the group consisting of group IA and group IIA of the Periodic Table, n denotes valency of M, and x, y and z denote numbers greater than 0, y being at least 70 and z being such that the zeolite has a water content that does not exceed 10% of its weight; and b. manufacturing the shaped object from the composition by one of extrusion, blow-extrusion, extrusion-thermoforming, or injection molding.

10. The process according to claim 9, wherein the shaped object is a bottle cap, and wherein the bottle cap is manufactured by injection molding.

* * * * *